(12) United States Patent
Kumhyr

(10) Patent No.: US 8,326,458 B2
(45) Date of Patent: Dec. 4, 2012

(54) NESTING NEGOTIATION FOR SELF-MOBILE DEVICES

(75) Inventor: David Bruce Kumhyr, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/967,383

(22) Filed: Dec. 14, 2010

(65) Prior Publication Data

US 2011/0082583 A1    Apr. 7, 2011

Related U.S. Application Data

(62) Division of application No. 12/136,311, filed on Jun. 10, 2008, now Pat. No. 7,894,940.

(51) Int. Cl.
*G05B 19/418* (2006.01)
*G06F 19/00* (2011.01)

(52) U.S. Cl. ........... 700/248; 700/245

(58) Field of Classification Search ........... None
See application file for complete search history.

(56) References Cited

U.S. PATENT DOCUMENTS

| | | |
|---|---|---|
| 4,672,280 A | 6/1987 | Honjo |
| 4,777,416 A | 10/1988 | George, II et al. |
| 5,220,263 A | 6/1993 | Onishi et al. |
| 5,301,096 A | 4/1994 | Klontz et al. |
| 5,462,439 A | 10/1995 | Keith |
| 5,568,030 A | 10/1996 | Nishikawa et al. |
| 5,668,977 A | 9/1997 | Swanstrom et al. |
| 5,906,646 A | 5/1999 | Kemner |
| 6,323,775 B1 | 11/2001 | Hansson |
| 6,374,155 B1 | 4/2002 | Wallach et al. |
| 6,496,755 B2 | 12/2002 | Wallach et al. |
| 6,584,375 B2 | 6/2003 | Bancroft et al. |
| 6,650,975 B2 | 11/2003 | Ruffner |
| 6,687,571 B1 | 2/2004 | Byrne et al. |
| 6,764,373 B1 | 7/2004 | Osawa et al. |
| 6,831,221 B2 | 12/2004 | Hulen |
| 6,836,701 B2 | 12/2004 | McKee |
| 7,054,716 B2 | 5/2006 | McKee et al. |

(Continued)

FOREIGN PATENT DOCUMENTS

JP    3284103    6/1993

OTHER PUBLICATIONS

Sempe et al., "Autonomous Robots Sharing a Charging Station with no Communication: A Case Study", 2002, pp. 1-10.

(Continued)

*Primary Examiner* — Khoi Tran
*Assistant Examiner* — Nicholas Kiswanto
(74) *Attorney, Agent, or Firm* — Yee & Associates, P.C.; Libby Toub

(57) ABSTRACT

Disparate robotic devices can be automatically recharged and reprogrammed by self-scheduling individual time slots for the available recharging area(s) of a charging station. These charging stations provide a nest to which each robot must return periodically for power. These nests can also provide new tasking or patches for the robotic devices. The charging station and the robotic devices are both provided with communications capabilities and a protocol by which they can negotiate to find a time slot in which the device can be recharged, as well as determining a correct connector and a battery type.

20 Claims, 4 Drawing Sheets

U.S. PATENT DOCUMENTS

| | | |
|---|---|---|
| 7,066,291 B2 | 6/2006 | Martins et al. |
| 7,117,067 B2 | 10/2006 | McLurkin et al. |
| 7,376,487 B2 | 5/2008 | Kumhyr |
| 7,856,290 B2 | 12/2010 | Kumhyr |
| 7,894,940 B2 | 2/2011 | Kumhyr |
| 2002/0005707 A1 | 1/2002 | Kerai et al. |
| 2002/0007230 A1 | 1/2002 | Ueno et al. |
| 2002/0095239 A1 | 7/2002 | Wallach et al. |
| 2002/0146347 A1 | 10/2002 | McNeil |
| 2002/0153185 A1 | 10/2002 | Song et al. |
| 2002/0165638 A1 | 11/2002 | Bancroft et al. |
| 2003/0030399 A1 | 2/2003 | Jacobs |
| 2003/0212472 A1 | 11/2003 | McKee |
| 2004/0073337 A1 | 4/2004 | McKee et al. |
| 2004/0090206 A1 | 5/2004 | Choi |
| 2004/0093650 A1 | 5/2004 | Martins et al. |
| 2007/0291109 A1 | 12/2007 | Wang et al. |
| 2007/0299549 A1 | 12/2007 | Kumhyr |
| 2008/0231227 A1 | 9/2008 | Kumhyr |

OTHER PUBLICATIONS

Michaud et al., "Sharing Charging Stations for Long-Term Activity of Autonomous Robots", IEEE, Oct. 2002, pp. 2746-2751.

USPTO Office Action for U.S. Appl. No. 10/721,436 dated Feb. 23, 2007.

USPTO Final Office Action for U.S. Appl. No. 10/721,436 dated Jul. 5, 2007.

USPTO Notice of Allowance for U.S. Appl. No. 10/721,436 dated Sep. 14, 2007.

USPTO Office Action for U.S. Appl. No. 11/850,468 dated Jul. 29, 2008.

USPTO Final Office Action for U.S. Appl. No. 11/850,468 dated Jan. 28, 2009.

USPTO Office Action for U.S. Appl. No. 11/850,468 dated Oct. 5, 2009.

USPTO Notice of Allowance for U.S. Appl. No. 11/850,468 dated Mar. 24, 2010.

USPTO Notice of Allowance for U.S. Appl. No. 12/136,311 dated Oct. 7, 2010.

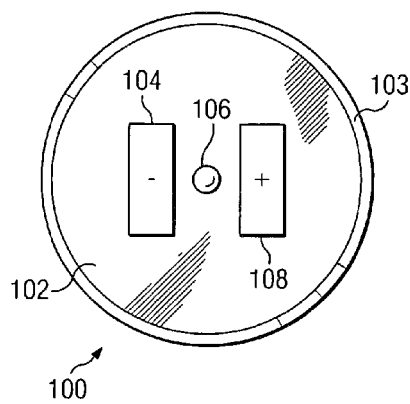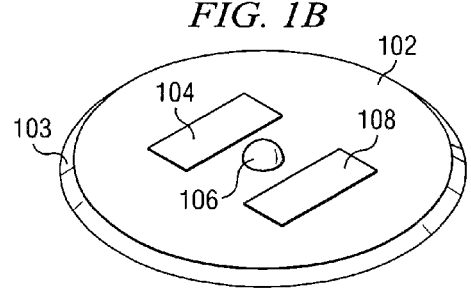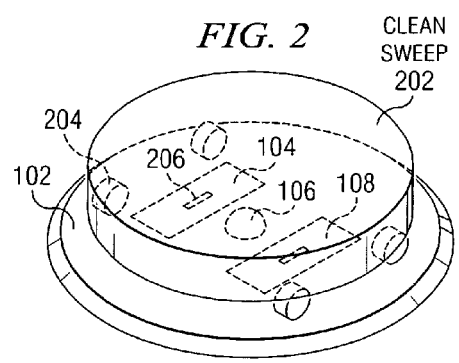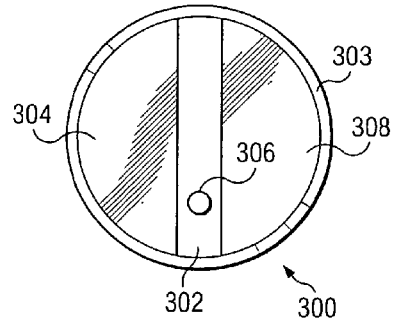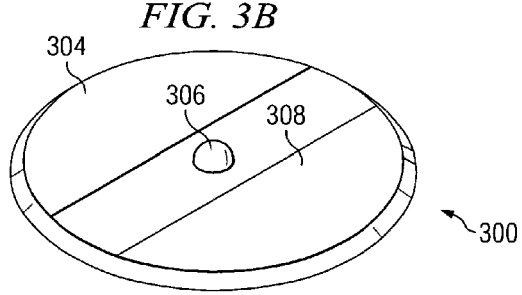

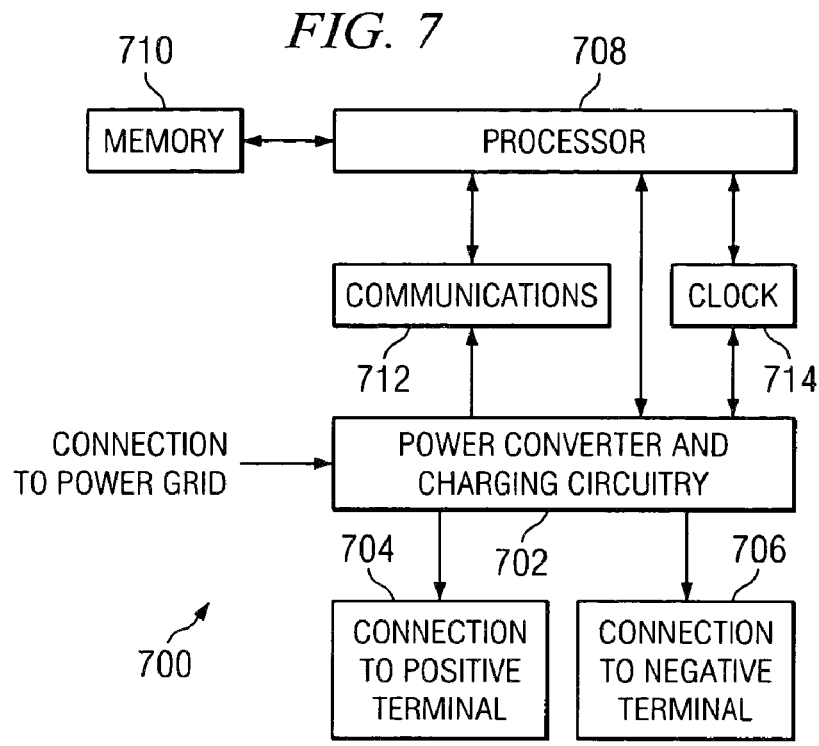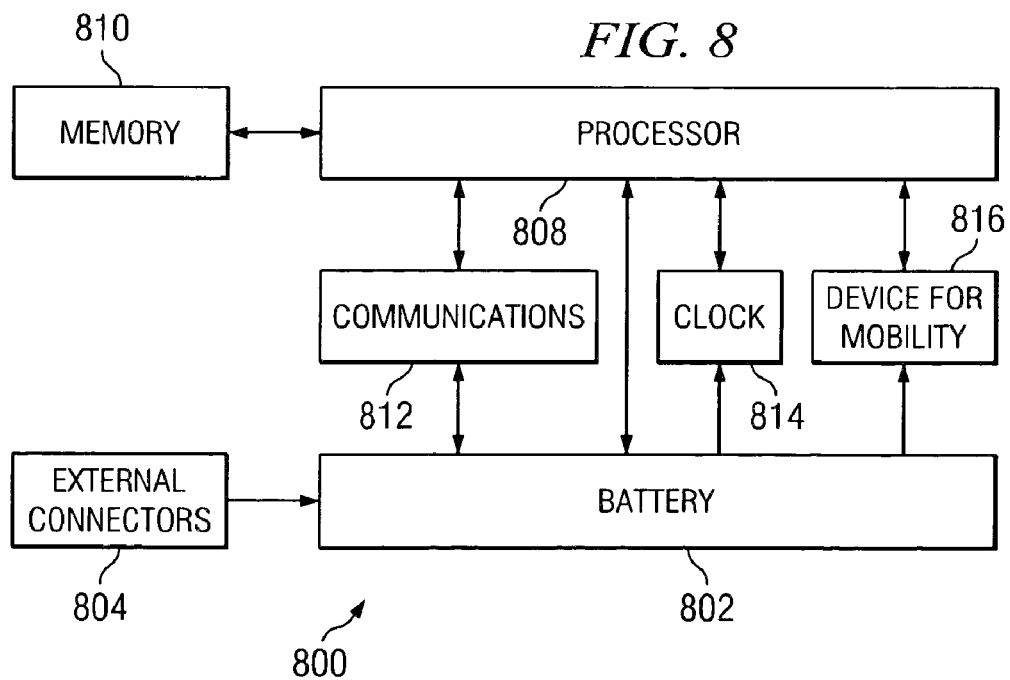

NESTING NEGOTIATION FOR SELF-MOBILE DEVICES

This application is a divisional of application Ser. No. 12/136,311, filed Jun. 10, 2008, now U.S. Pat. No. 7,894,940 status allowed, which was a continuation of application Ser. No. 11/850,468, filed Sep. 5, 2007, now U.S. Pat. No. 7,856,290 status allowed, which was a continuation of application Ser. No. 10/721,436, filed on Nov. 25, 2003, which issued as U.S. Pat. No. 7,376,487.

BACKGROUND OF THE INVENTION

1. Technical Field

The invention relates to the ability of a robotic device to monitor and negotiate the charging of its own battery and to automatically receive re-tasking and patches during recharging. More specifically, the invention relates to a nesting device to which each robotic device must return periodically, with the robotic devices and nesting device sharing a protocol by which they negotiate a time slot for each robotic device.

2. Description of Related Art

Robots have been the stuff of science fiction from the early part of the nineteenth century to the present. Now, however, many types of robotic devices have been realized and many more are being designed. Some of these are relatively fixed, such as a robotic arm to locate tapes in a tape library, and these can be connected to a source of electricity by a power line. For self-mobile robotic devices, a battery is generally included as a power supply that must be periodically recharged. For a self-mobile robot, periodic recharging of the battery is necessary and it has been suggested that the more capable a robot is of taking care of its own needs, the less of a burden it is on the infrastructure it serves. For instance, U.S. Pat. No. 4,777,416 to George et al., in its abstract, discloses a "recharge docking system for a battery-powered mobile robot which senses when the battery charge is below a predetermined level and halts the travel of the robot at its next navigational node following which the robot independently plots and negotiates a path from the next node back to a base node at a recharge station, where the batteries are charged." Thus, providing for automatic recharging is known.

However, as self-mobile robotic devices infiltrate into the mainstream, a company or individual who utilizes robots can find themselves with a large number of robotic devices that require regular recharging. It would be desirable to have a device and protocol by which a large number of robotic devices can be charged by a single charging unit in the most efficient possible manner, i.e., without human intervention.

SUMMARY OF THE INVENTION

A nesting device, system, and method are provided by which a number of disparate robotic devices can be automatically recharged and reprogrammed during self-scheduled time slots. The nesting device contains one or more recharging areas, which can be generic to serve disparate types of devices or can contain a specific connector for a certain type of robotic device. Because these nests must be visited on a regular basis, they can communicate updates or new sets of instructions to the robotic devices during recharging. The nesting device and the robotic devices are both provided with communications capabilities and a protocol by which they can negotiate to find a time slot in which the robotic device can be recharged and provided other information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 1A and 1B depict a top-down view and a perspective view of a nesting station according to a first embodiment of the present invention.

FIG. 2 depicts a robotic device connected for recharging to the nesting station of FIG. 1.

FIGS. 3A and 3B depict a top-down view and a perspective view of a nesting station according to an alternate embodiment of the present invention

FIG. 7 is a block diagram of the circuitry necessary for the nesting station.

FIG. 8 is a flowchart of the protocol for negotiating a time slot for recharging according to an embodiment of the invention.

DETAILED DESCRIPTION OF THE PREFERRED EMBODIMENT

Figure 4:
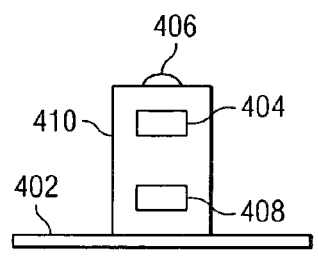
FIG. 4 depicts a nesting station configured as a free-standing tower, according to an alternate embodiment of the invention.

The invention will now be described with regard to the drawings. With attention first to FIGS. 1a and 1B, nesting station 100 is shown according to an exemplary embodiment of the invention. In its broadest embodiments, nesting station 100 of the present invention is designed to offer charging (and retasking, if needed) to as wide a variety of robotic devices as possible. To this end, nesting station 100 has base 102 onto which a robotic device can roll by means of beveled edge 103. The top surface of nesting station 100 is generally flat to provide a stable surface on which the robotic devises can rest. Two metal plates form respectively negative terminal 104 and positive terminal 108. Between these two contact plates, infrared (IR) transmitter/receiver 106 allows communications between nesting device 100 and the robotic devices. Infrared transmissions can be used for point-to-point communications when there are no obstructions between the charging station and robotic device. When the communications is point-to-point, it is necessary that a protocol exist for regular contact between the nesting station and the robotic devices whenever they are within line of sight. This contact can be initiated by nesting station 100 or by the robotic devices, but should include checking the battery level in order to estimate time until a charge is needed. Alternatively, a trigger point can be set for each robot, indicating a battery level at which the device should seek recharging. The value of this trigger point would be determined according to the number of robotic devices using the nesting station, the length of time necessary for charging, the level of activity of the robotic devices, etc. When it is determined that the battery has reached a trigger point, the robotic device requests a time slot for charging. Nesting station 100 keeps a record of scheduled charging times so that two devices are not attempting to charge at the same time. Nesting station 100 and robotic devices then work through a suitable protocol to schedule a time. The robotic device can proceed to nesting station 100, if it is available, or return to work until nesting station 100 is free.

Because the nesting station 100 has a generalized structure, it is possible that the station 100 can offer charging to many different types of batteries. To this end, the nesting station 100 is preferably configured to determine the type of battery to be charged and to shift its output characteristics accordingly.

FIG. 2 shows small robotic cleaning device 202 that has returned to nesting unit 100 as scheduled. Robotic device 202 has rolled onto base 102 of nesting unit 100, using wheels 204. Once there, robotic device 202 either extends or allows to drop two metal connectors 206. These will contact respectively positive contact 108 and negative contact 104. At the same time, an infrared port (not shown) on the bottom of robotic device 202 is brought into alignment with IR port 406 on top of nesting station 100. Further communications, such as new tasks to be performed or upgrades to the software of the robotic device, can be downloaded to the device while it is charging.

FIGS. 3A and 3B show an alternate version of the innovative nesting device. In this version, there are two main changes from the embodiment of FIGS. 1A and 1B. First, electrical connectors 304, 308 on nesting station 300 are much larger, taking up most of the surface area on base 302. Secondly, rather than IR 106, the device is equipped with a technology, such as Bluetooth (a short-range radio signal), WiFi (wireless fidelity, a generic term for any type of 802.11 network), or a similar technology. These technologies do not require line-of-sight to operate and thus has more flexibility in communicating with the robotic devices.

Figure 5:
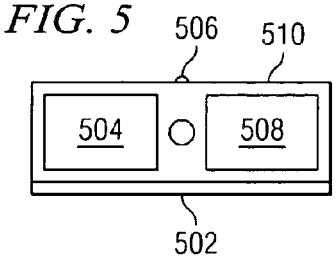
FIG. 5 depicts a nesting station according to a further alternate embodiment of the invention.

FIG. 4 discloses another embodiment of the innovative nesting station. In this embodiment, electrodes 404, 408 are placed, one above the other, in a tower arrangement. Body 410 of nesting station 400 can be mounted on a stable base 401 or can be attached to a wall for stability. Communications link 406 can utilize any of the wireless technologies available. FIG. 5 is another embodiment in which contacts 504, 508 are in a vertical configuration, with body 510 either supported by base 502 or fastened to a wall. Again, communications link 506 can utilize any of the wireless technologies. In both FIGS. 4 and 5, the robotic device does not rest on the nesting station, but moves into close proximity so that positive and negative terminals of the battery are able to come into contact with the contacts.

Figure 6:
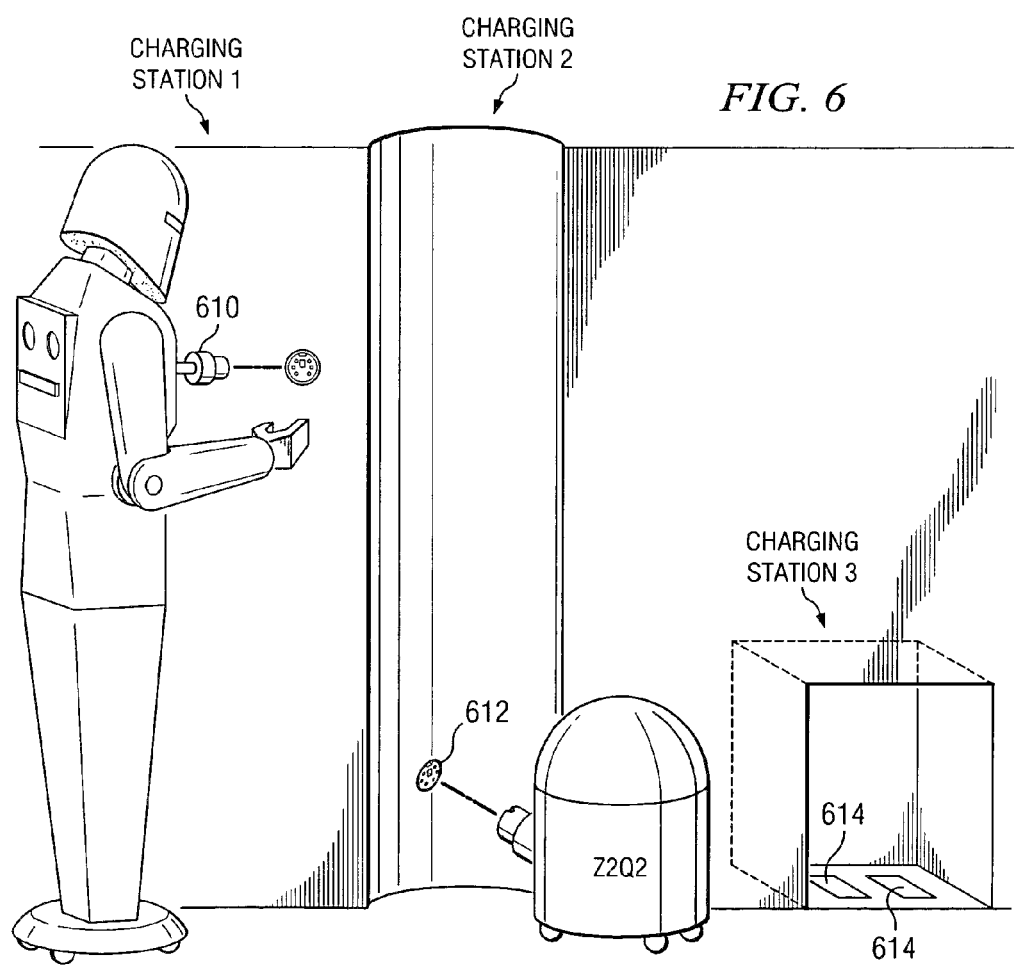
FIG. 6 depicts a nesting station having multiple connectors for charging, according to a further alternate embodiment of the invention.

In an alternate embodiment, the nesting device does not contain generic, flat contacts, but a number of different styles of contacts are made available to suit the needs of a variety of robotic devices. FIG. 6 demonstrates a fanciful version of this embodiment of the invention, with three connectors 610, 612, 614 provided. In this embodiment the processor will keep a separate schedule for each type of connector; a robotic device will need to know and communicate the type of connection it requires.

FIG. 7 demonstrates circuitry 700 necessary to run the innovative nesting unit. In this diagram, a combined power converter and charging circuit 702 receives power from the main power grid and converts it to the proper voltage needed by the robotic devices. This converted power is sent to the positive and negative terminals of the nesting station and from there into the battery of the robotic unit. In the preferred embodiment, the power converter and charging circuit 702 are adapted to charge more than one battery type. To this end, the power converter and charging circuit 702 preferably has the ability to shift its output characteristics from voltage source to current source, as well as the ability to monitor the charging current and voltage and the charging time. Processor 708, which is connected to memory 710, controls power converter 702. Processor 708 has connections to communications module 712 for communicating with the robotic devices and to clock 714 that supplies date and time. A schedule of charging times can be kept in memory 710 for access when scheduling.

FIG. 8 demonstrates circuitry 800 necessary to run the innovative robotic device. In this illustrative embodiment, the robotic device 800 contains a processor 808 that directs its activity according to instructions stored in the memory 810. The robotic device 800 also contains some type of device that provides mobility 816 for the robotic device, a clock 814 for determining the time, and communications capabilities 812 to allow it to communicate with the charging station. The processor 808, clock 814, and communications device 812 are all powered by battery 802. Battery 802 is in turn charged using external connectors 804.

Figure 9:
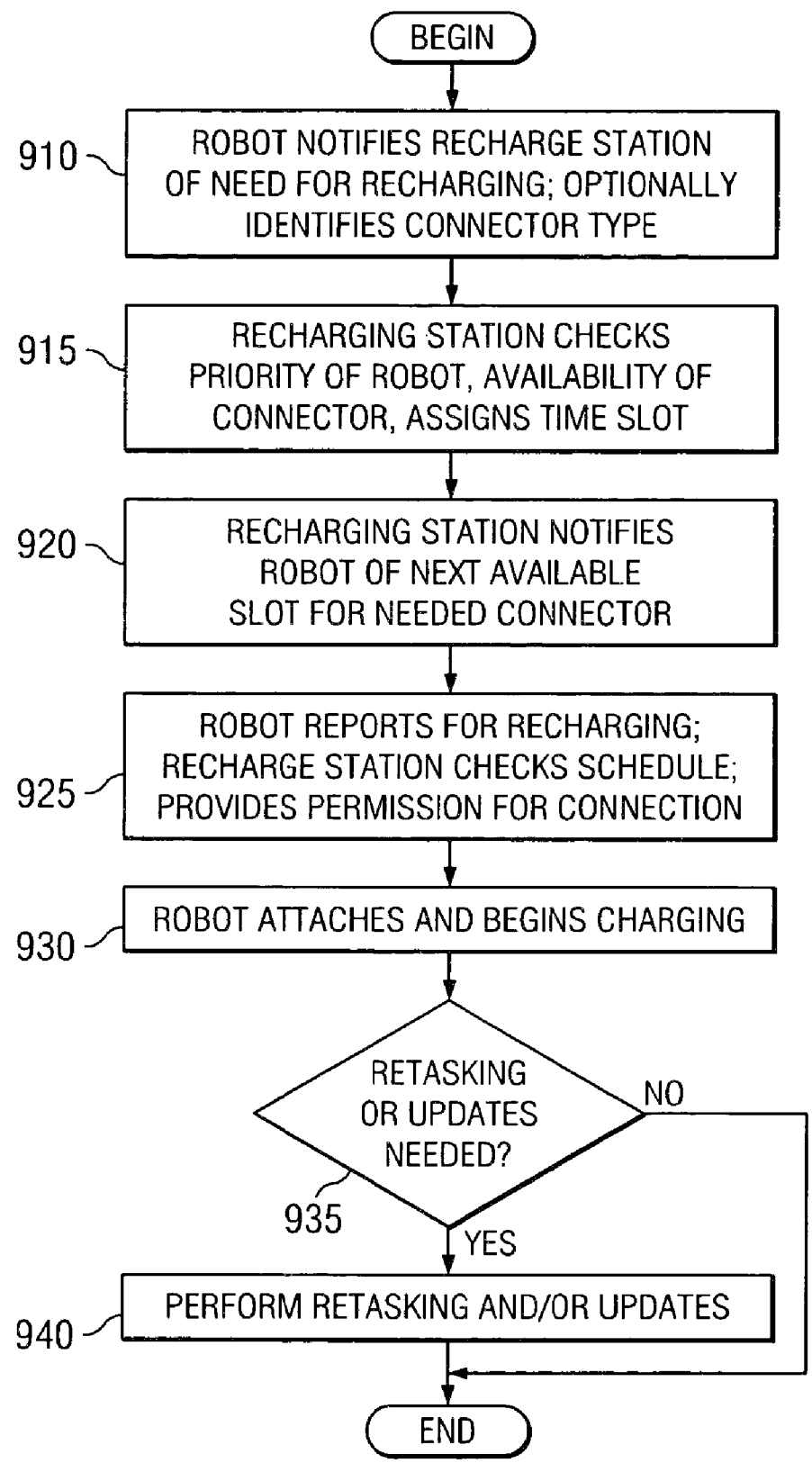
FIG. 9 is a flowchart of a method by which the nesting station and the robotic devices can negotiate charging times according to an embodiment of the invention.

FIG. 9 demonstrates an exemplary flowchart of a method by which the nesting station and the robotic devices can negotiate charging times. In this exemplary embodiment, a triggering device on a robotic device has detected that the battery charge is getting low. The robotic device will contact the nesting station (step 910) at the first available moment. If a line-of-sight form of communication is utilized, there can be a delay in time between the device noticing that charging is needed and contacting the nesting station. If a robotic device follows a preset route, this may mean waiting until reaching a known location where communications are possible; if not, the device can periodically attempt communications until a response is received. Once the nesting station is contacted, the robotic unit requests a time slot for charging. If a number of different types of connectors are available, the unit will also identify the type of connector necessary.

Depending on its programming, the nesting station checks the availability of the needed connector and if necessary, the priority of the robotic device, then assigns a time slot to the robotic device (step 915). The priority of a robotic device can be important if the nesting station is shared, for example, by some devices that are used daily and others that are only needed weekly or sporadically. A device that is used only weekly may have a low priority if the device is not scheduled to be used for several days, but can be bumped up in priority nearer to the time of its use. In systems where only a few robotic devices are used, the scheduling can be very simple, while a corporation using a large number of mobile robotic devices can have a more complex scheduling algorithm as necessary.

The nesting station notifies the robotic device of the next available slot and sets that time aside for this particular device (step 920). Unless a slot is available immediately, the robotic device will store the time at which it is scheduled for charging. When this time nears, the robot reports at the nesting station for charging. The nesting station can verify that this robotic device is indeed for this time slot and grant permission for charging (step 925). At that time, the robotic device can position itself and begin charging (step 930). While the device is recharging, the nesting station can check to see is there is an outstanding order to retask the robotic device by providing new or updated instructions, whether patches are needed in the programming (step 935). If so, the nesting station can communicate this to the robotic device and proceed to provide updating while the robotic device is charging (step 940). Because the robotic devices themselves perform their own charging and updating, the owner or manager of the robotic devices does not need to contact each robotic device individually. Instead, the manager simply provides instructions to the nesting station(s) and allows the nesting station(s) to coordinate the updates with the robotic devices themselves.

One of ordinary skill in the art will realize that variations in this flowchart are possible without departing from the spirit of the invention. One such example can be an environment where only a few robotic devices are used and the nesting unit is available much of the time. In this environment, the nesting station can be programmed to respond to a request for charging with a simple notification that the charger is currently available or not available. The requesting robotic device can be instructed to check back in a given amount of time to see if the nesting station is available. Alternatively, where a large number of robotic units share a nesting station, a request from a high priority robotic device can cause another, already scheduled, robotic device to be "bumped" out of its time slot into a later slot. In this case, the nesting station must contact the device originally scheduled and negotiate a later time for charging.

In a further alternate embodiment, the negotiations can be more extensive. For example, if a robotic device has a regular schedule of activity it must maintain, the robotic device can be programmed to provide suggested time slots when it is available for recharging; the nesting station can then verify that a suggested time is available or not, or can bump a lower priority device from a needed slot.

Thus, the exact protocol for negotiation can be varied according to the environment, but the embodiments of the inventive nesting system allow the robotic devices to regularly schedule and receive nesting without human intervention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A recharging station, comprising:
    a first connector for a self-mobile device, said first connector being configured in such a manner that self-mobile devices can self-position into a position for charging;
    a first communications device capable of carrying on two-way communications with a plurality of self-mobile devices; and
    a processor connected to said first connector and said first communications device, said processor negotiates with the plurality of self-mobile devices according to a first protocol in order to administer time slots for charging the plurality of self-mobile devices.

2. The recharging station of claim 1, further comprising a second protocol that automatically provides new instructions or updates to basic programming to ones of the plurality of self-mobile devices.

3. The recharging station of claim 2, further comprising a second connector configured in such a manner that self-mobile devices can self-position into a position for charging.

4. The recharging station of claim 3, wherein said first connector and said second connector are identical.

5. The recharging station of claim 3, wherein said first connector and said second connector work with different types of self-mobile devices.

6. The recharging station of claim 2, wherein the processor accesses a record of scheduled charging times for the plurality of self-mobile devices.

7. The recharging station of claim 6, wherein a separate schedule of charging times is maintained for each different type of connector of the charging station.

8. The recharging station of claim 1, wherein said first connector comprises a first flat plate connected to form a negative contact and a second flat plate connected to form a positive contact.

9. The recharging station of claim 8, wherein said first and second flat plates are mounted horizontally and a self-mobile device positions over said first and said second plates for charging.

10. The recharging station of claim 8, wherein said first and second flat plates are mounted vertically and a self-mobile device positions over said first and said second plates for charging.

11. The recharging station of claim 1, further comprising a second connector configured in such a manner that self-mobile devices can self-position into a position for charging.

12. The recharging station of claim 11, wherein said first connector and said second connector are identical.

13. The recharging station of claim 11, wherein said first connector and said second connector work with different types of self-mobile devices.

14. The recharging station of claim 13, wherein the processor accesses a record of scheduled charging times for the plurality of self-mobile devices.

15. The recharging station of claim 14, wherein a separate schedule of charging times is maintained for each different type of connector of the charging station.

16. The recharging station of claim 11, wherein the processor accesses a record of scheduled charging times for the plurality of self-mobile devices.

17. The recharging station of claim 1, wherein the processor accesses a record of scheduled charging times for the plurality of self-mobile devices.

18. The recharging station of claim 17, wherein a separate schedule of charging times is maintained for each different type of connector of the charging station.

19. A recharging station, comprising:
    a first connector for a self-mobile device, said first connector being configured in such a manner that self-mobile devices can self-position into a position for charging;
    a first communications device capable of carrying on two-way communications with a plurality of self-mobile devices; and a processor connected to said first connector and said first communications device, said processor comprising means for negotiating with the plurality of self-mobile devices according to a first protocol in order to administer time slots for charging the plurality of self-mobile devices.

20. The recharging station of claim 19, further comprising a second protocol that automatically provides new instructions or updates to basic programming to ones of the plurality of self-mobile devices.

* * * * *